United States Patent
Yan et al.

(10) Patent No.: US 10,703,835 B2
(45) Date of Patent: *Jul. 7, 2020

(54) HYPERBRANCHED CATIONIC MUSSEL-IMITATED POLYMER AND METHOD OF PREPARING THE SAME

(71) Applicant: Sichuan Huili Industry Co., Ltd., Chengdu, Sichuan (CN)

(72) Inventors: Bin Yan, Sichuan (CN); Hui Zhang, Sichuan (CN); Jinzhi Bai, Sichuan (CN)

(73) Assignee: Sichuan Huili Industry Co., Ltd., Chengdu (CN)

( * ) Notice: Subject to any disclaimer, the term of this patent is extended or adjusted under 35 U.S.C. 154(b) by 34 days.

This patent is subject to a terminal disclaimer.

(21) Appl. No.: 16/240,273

(22) Filed: Jan. 4, 2019

(65) Prior Publication Data

US 2020/0071433 A1 Mar. 5, 2020

(30) Foreign Application Priority Data

Sep. 3, 2018 (CN) .......................... 2018 1 1019603

(51) Int. Cl.
*C08F 20/60* (2006.01)
*C08F 220/60* (2006.01)
*C08K 5/20* (2006.01)
*C08K 5/23* (2006.01)
*C08K 5/38* (2006.01)

(52) U.S. Cl.
CPC ............ *C08F 20/60* (2013.01); *C08F 220/60* (2013.01); *C08K 5/20* (2013.01); *C08K 5/23* (2013.01); *C08K 5/38* (2013.01); *C08F 220/603* (2020.02); *C08F 2438/03* (2013.01)

(58) Field of Classification Search
CPC .................................................. B32B 27/34; B32B 9/007; B32B 7/12; B32B 37/1207; B32B 2439/80; B32B 2310/14; C08F 20/56; C08F 20/28; C08K 5/38; C08J 5/18

See application file for complete search history.

(56) References Cited

PUBLICATIONS

Czech, Z., et al., "Influence of selected photoinitiators type II on tack, peel adhesion, and shear strength of UV-crosslinked solvent-borne acrylic pressure-sensitive adhesives used for medical applications," *Polymer Bulletin*, 2012, 68:441-452, Springer-Verlag 2011.
Cismaş, C. et al., "exo-N-[2-(4-Azido-2,3,5,6-tetrafluorobenzamido)ethyl]-dC: a novel intermediate in the synthesis of dCTP derivatives for photoaffinity labelling," *Tetrahedron Letters*, 2008, 49:1336-1339, 2007 Elsevier Ltd.

*Primary Examiner* — Samir Shah
(74) *Attorney, Agent, or Firm* — Saliwanchik, Lloyd & Eisenschenk

(57) ABSTRACT

The present invention discloses a hyperbranched cationic mussel-imitated polymer and a method of preparing the same. The hyperbranched polymer disclosed in the present invention has the excellent mussel-imitated non-selective adhesive property, good biocompatibility and adhesive strength adjustability. The method of the present invention includes the following steps: (A) adding an initiator, a RAFT agent and a first reaction mixture to a vessel containing DMF to form a second reaction mixture; (B) stirring the second reaction mixture until homogenous, and introducing argon to a reaction system to remove oxygen in the reaction system; (C) heating and stirring the second reaction mixture to carry out a reaction; (D) after a product with a desired molecular weight being produced, the reaction system being exposed to air and cooled rapidly in a cold water bath to terminate the reaction; and (E) purifying the product to obtain the hyperbranched cationic mussel-imitated polymer.

10 Claims, No Drawings

HYPERBRANCHED CATIONIC MUSSEL-IMITATED POLYMER AND METHOD OF PREPARING THE SAME

CROSS-REFERENCE TO RELATED APPLICATION

This application claims the benefit under 35 U.S.C. § 119 of Chinese Application No. 201811019603.0, filed Sep. 3, 2018, which hereby incorporated in its entirety.

FIELD OF THE INVENTION

The present invention relates to the field of binders, and more particularly to a hyperbranched cationic mussel-imitated polymer and a method of preparing the same.

BACKGROUND OF THE INVENTION

As the main packaging material for the pharmaceuticals, polymer films have become increasingly important in daily life. However, affected by the production processes and physicochemical characteristics of the plastic films, the barrier properties of the plastic films to oxygen, water vapor, liquid substances, and other low molecular weight substances are difficult to meet the requirements of most drug packaging. The penetration of small molecular gases such as oxygen and water vapor into the packaging materials may cause the oxidation deterioration of the active ingredients in the drug, which gives rise to some phenomena like the proliferation of microorganisms, significantly shortening the shelf life of the drug. Therefore, the improvement of the barrier properties of plastic films to small molecular gases such as oxygen and water vapor and the possession of antibacterial properties are of great importance to improve the quality of the plastic films.

Graphene is a two-dimensional carbon nanomaterial, wherein each carbon atom connects with the other three carbon atoms to form covalent bonds by means of $sp^2$ hybridization, and then arrange into a honeycomb hexagonal lattice. The remaining single electron 2P orbital of each carbon atom coincides with each other to form a delocalized conjugated π bond. The six-membered ring of the graphene has a pore size of only 0.15 nm which is smaller than that of helium, and has natural gas barrier properties. Meanwhile, the transmittance of the single-layered graphene to visible light reaches up to 97%, allowing that the single-layered graphene can be used to easily produce film materials with excellent light transparency under suitable process conditions. Also, the single-layered graphene has a thickness of only 0.34 nm and a width ranging from a few microns to tens of centimeters. The aforementioned characteristics and properties make graphene to be an ideal nanometer barrier material.

At present, one of the methods of using graphene to prepare a barrier material is to adopt a binder to bond the graphene film material and the polymer film substrate together. Nonetheless, due to the small contact area and a few reaction sites between the existing binders and the graphene, the safety and bonding strength are poor. Meanwhile, the adhesive strength of the existing binder is not changeable, which not only causes a high manufacturing cost of the binder, but also fails to meet the requirements of the packaging material for drugs.

BRIEF SUMMARY OF THE INVENTION

The present invention aims to provide a hyperbranched cationic mussel-imitated polymer and a method of preparing the same, so as to solve the problems that the existing binders for the graphene packaging material have a low adhesive strength, a high manufacturing cost and the unchangeable adhesive strength, causing a low safety and a poor bonding strength between the graphene material and the polymer substrate.

The present invention is realized by the following technical solutions:

A hyperbranched cationic mussel-imitated polymer, having a structure of formula (I):

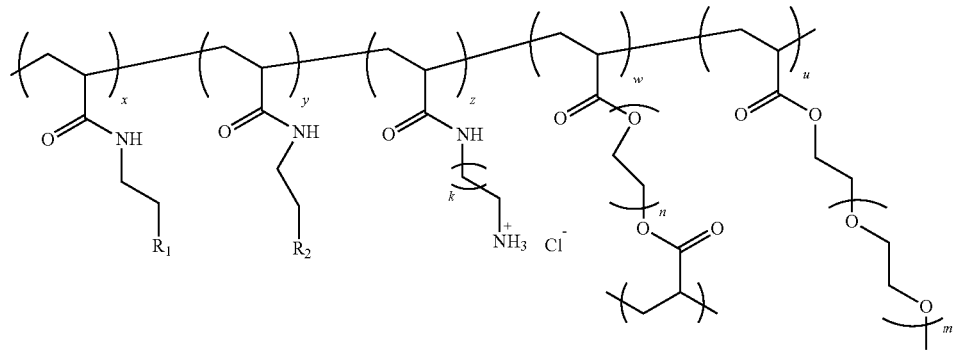

wherein x is 1-10, y is 20-80, z is 30-80, w is 5-20, u is 20-80, K is 1-5, n is 10-50, and m is 5-30;

wherein $R_1$ is a chemical group having a structure of formula (II):

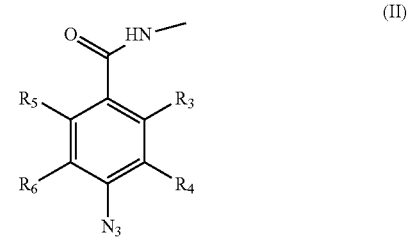

wherein $R_3$, $R_4$, $R_5$ or $R_6$ is individually selected from the group consisting of hydrogen and halogen; and wherein R2 is a chemical group selected from the group consisting of

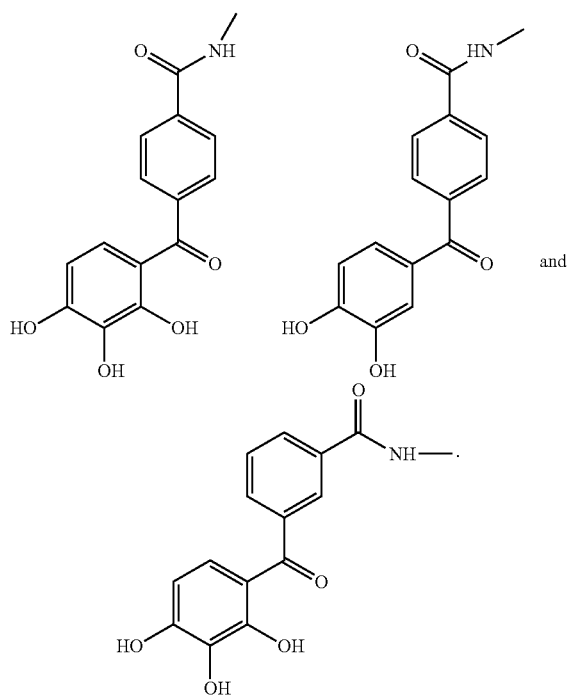

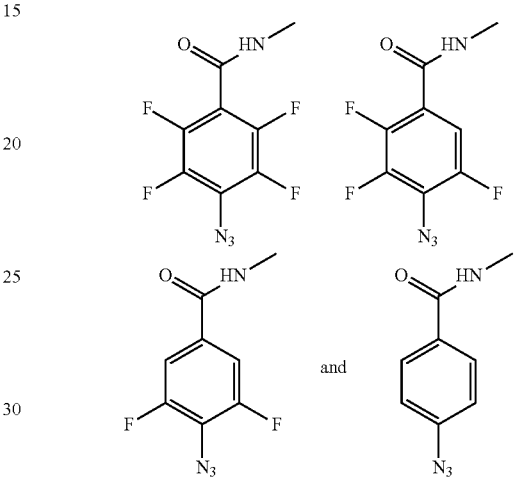

In the prior art, the small contact area and a few reaction sites between the existing binder and the graphene cause a small number of the covalent bonds formed through the chemical reaction between the binder and the graphene, thereby leading the film obtained by using the binder to bind the graphene film material and the polymer film substrate together to have the low safety and poor bonding strength. In addition, since the adhesive strength of the binder cannot be changed according to the actual demands, the applications of the binder in binding the graphene film packaging material are limited.

To solve the aforementioned problems, the inventors uses the reversible addition fragmentation chain transfer (RAFT) polymerization method which uses a multi-hydroxylbenzoylbenzamide ene amide monomer, a cationic monomer, a photo-responsive monomer, poly(ethylene glycol) diolefine acid ester, and poly(ethylene glycol) olefine acid ester to prepare a binder having a high adhesive strength and being able to bond with the graphene firmly.

Specifically, a large amount of free catechol groups and cationic groups of the $R_2$ in formula (I) allows the hyperbranched polymer to have good adhesive properties to different substrates through a series of intermolecular forces with the different strength such as van der Waals force, hydrogen bonding, the interacting force between cationic and pi and the like. Meanwhile, the cationic end groups can enhance the bonding force of the catechol groups to various substrates through synergistic effect. Moreover, as shown in formula (II), the groups of R3, R4, R5 and R6 in R1 can partially or totally be halogen which may generate a benzene ring radical under the action of light in addition to the intermolecular force between halogen and graphene molecule, wherein the benzene ring radical may attack the C—H bond on the graphene molecule and chemically react to form the covalent bond, which the latter greatly improves the bonding strength between the hyperbranched polymer and the graphene molecule. Preferably, the groups of R3, R4, R5 and R6 can partially or totally be fluorine. Under light condition, the number of the covalent bonds formed between fluorine and graphene is tunable, so that the binding strength between the hyperbranched polymer and graphene is changeable according to the light intensity, which allows the adhesive strength of the binder to be adjusted depending upon the specific demands, and makes the binder more suitable for the graphene film packaging material. Preferably, the polymerization degree of the hyperbranched polymer is from 100 to 400.

In summary, compared with the traditional small molecule binder and the common polymer binder, the hyperbranched polymer disclosed in the present invention has the excellent mussel-imitated non-selective adhesive property, good biocompatibility, and adhesive strength adjustability.

As a preferred embodiment of the present invention, in formula (II), $R_3$, $R_4$, $R_5$ or $R_6$ is individually selected from the group consisting of hydrogen and fluorine.

As a preferred structure of the $R_1$, the $R_1$ is selected from the group consisting of Furthermore, in formula (I), K is 1-3, n is 20-30, and m is 10-20.

The present invention also provides a method of preparing the hyperbranched cationic mussel-imitated polymer described above, the method comprises following steps:

(A) adding an initiator, a RAFT agent and a first reaction mixture to a vessel containing DMF to form a second reaction mixture;

(B) stirring the second reaction mixture until homogenous, and introducing argon to a reaction system to remove the oxygen therein;

(C) heating and stirring the second reaction mixture to carry out a reaction;

(D) after a product with a desired molecular weight being produced, the reaction system being exposed to air and cooled rapidly in a cold water bath to terminate the reaction; and (E) purifying the product to obtain the hyperbranched cationic mussel-imitated polymer;

wherein the first reaction mixture comprises a multi-hydroxylbenzoylbenzamide ene amide monomer, a cationic monomer, a photo-responsive monomer, poly(ethylene glycol) diolefine acid ester and poly(ethylene glycol) olefine acid ester.

At first, the initiator, the RAFT agent, the multi-hydroxylbenzoylbenzamide ene amide monomer, the cationic monomer, the photo-responsive monomer, poly(ethylene glycol) diolefine acid ester, and poly(ethylene glycol) olefine acid ester are added to a round bottom flask containing DMF (i.e., N,N-dimethylformamide), and are stirred until homogenous. Preferably, the initiator has a concentration of 0.012M. Next, argon is introduced to the reaction system to remove oxygen. Preferably, argon is introduced for 20-25 minutes. Then the round bottom flask is placed in an oil bath, and the mixture in the round bottom flask is heated and stirred, wherein the preferred oil bath temperature is 60-90°

C., and the preferred stirring speed is 600-800 rmp. After the reaction is reached the expected conversion as well as the product with the desired molecular weight is produced, the round bottom flask is placed in the cold water bath to rapidly cool the reaction system. Later, the crude product is purified to obtain a light brown hyperbranched cationic mussel-imitated polymer. Preferably, the solvent used for purification is dichloromethane and diethyl ether.

Furthermore, the multi-hydroxylbenzoylbenzamide acylamide monomer has a molar percentage of 20-40%, the cationic monomer has a molar percentage of 30-40%, the photo-responsive monomer has a molar percentage of 1-5%, poly(ethylene glycol) olefine acid ester has a molar percentage of 20-40%, and poly(ethylene glycol) diolefine acid ester has a molar percentage of 5-10%.

Furthermore, the multi-hydroxylbenzoylbenzamide acylamide monomer is N-(2-acrylamidoethyl)-4-(2,3,4-trihydroxybenzoyl)benzamide, N-(2-acrylamidoethyl)-4-(3,4-dihydroxybenzoyl)benzamide or N-(2-acrylamidoethyl)-3-(2,3,4-trihydroxybenzoyl)benzamide.

The cationic monomer is any one of N-(2-aminoethyl) acrylamide hydrochloride, N-(2-aminoethyl)methacrylamide hydrochloride, N-(3-aminopropyl)acrylamide hydrochloride, N-(3-aminopropyl)methacrylamide hydrochloride, N-(4-aminobutyl)acrylamide hydrochloride, N-(4-aminobutyl)methacrylamide hydrochloride, N-(6-aminohexyl)acrylamide hydrochloride, N-(6-aminohexyl)methacrylamide hydrochloride or (2-aminoethyl)methacrylate hydrochloride.

The photo-responsive monomer is any one of N-(2-acrylamidoethyl)-4-azido-2,3,5,6-tetrafluorobenzamide, N-(2-acrylamidoethyl)-4-azido-2,3,5-trifluorobenzamide, N-(2-acrylamidoethyl)-4-azido-2,5-difluorobenzamide or N-(2-acrylamidoethyl)-4-azidobenzamide.

Poly(ethylene glycol) diolefine acid ester is either poly(ethylene glycol) diacrylate or poly(ethylene glycol) dimethacrylate, and can be used to adjust the esterification degree of the hyperbranched polymer. Poly(ethylene glycol) olefine acid ester is either poly(ethylene glycol)methyl ether acrylate or poly(ethylene glycol)methyl ether methacrylate, and can be used to adjust the solubility of the hyperbranched polymer. Preferably, the molecular weight of the polyethylene glycol ranges from 200 to 6000.

Furthermore, the RAFT agent and the first reaction mixture are in a molar ratio of 1:2:100; and in step (C), a reaction temperature is 60-90° C., and a stirring speed is 600-800 rmp. Preferably, the reaction temperature is 70° C., and the stirring speed is 700 rmp.

Furthermore, the initiator is 1,1-azobis(cyclohexanecarbonitrile), 2,2'-azobis(2-methylpropionitrile) or 4,4'-azobis(4-cyanovaleric acid); and the RAFT agent is any one of 2-(dodecyltrithiocarbonate)-2-methylpropionic acid, 4-cyano-4-(phenylthioformylthio)pentanoic acid or 2-cyano-2-propyl-4-cyanobenzene dithiocarbonate.

The present invention further provides a binder, wherein the binder is a solution of the hyperbranched cationic mussel-imitated polymer disclosed above. Preferably, the weight percentage of the hyperbranched polymer is 1%-15%.

Compared with the prior art, the present invention has the following advantages and beneficial effects:

1. The hyperbranched polymer of the present invention has a large amount of free catechol groups and cationic groups, allowing the hyperbranched polymer to have good adhesive properties to different substrates. Meanwhile, the presence of the cationic end groups can enhance the bonding force of the catechol groups to various substrates through synergistic effect.

2. The photo-responsive monomer of the present invention adopts fluorine substitution. Under light condition, the covalent bond between the fluorine and graphene may be broken or combined, so that the binding strength between the hyperbranched polymer and graphene is changeable according to the light intensity, which makes the adhesive strength of the binder may be adjusted depending upon the specific demands, and makes the binder be more suitable for the graphene film packaging material.

3. The method of preparing the hyperbranched polymer provided by the present invention is simple, and is low in raw material cost.

DETAILED DESCRIPTION OF THE PREFERRED EMBODIMENTS

In order to make the objects, the technical solutions and the advantages of the present invention clearer, the present invention is now further described in details below with reference to the embodiments or examples. The illustrative embodiments of the present invention and the description thereof are merely for purpose of illustration, and are not intended to limit the invention to the precise embodiments disclosed.

All the raw materials of the present invention are not particularly limited in their sources, and are commercially available or can be prepared in accordance with the conventional methods known to those skilled in the art. For example, the photo-responsive monomer can be synthesized by the esterification reaction, and the multi-hydroxylbenzoylbenzamide acylamide monomer can be synthesized according to the method disclosed in [J] Polymer Bulletin, 2012, 68, 441-452, and in [J] Tetrahedron Letters, 2008, 49, 1336-1339.

All the raw materials of the present invention are not particularly limited in their purity. The present invention preferably employs the analytical purity or the conventional purity in the field of binder preparation.

The expressions of the substitutes in the present invention are not particularly limited, and use the expressions known to those skilled in the art. Based on the common sense, those skilled in the art can correctly understand the meanings of expressions of the substitutes.

All the brands and abbreviations of all the raw materials of the present invention belong to the conventional brands and abbreviations in the field. Each of the brands and abbreviations is clear in its relative fields. The raw materials may be purchased or prepared with the conventional methods by those skilled in the art according to their brands, abbreviations and corresponding use.

EXAMPLE 1

Preparation of the Hyperbranched Cationic Mussel-Imitated Polymer P1:

N-(2-acrylamidoethyl)-3-(2,3,4-trihydroxybenzoyl)benzamide, N-(2-aminoethyl)methacrylamide hydrochloride, N-(2-acrylamidoethyl)-4-azido-2,3,5,6-tetrafluorobenzamide, poly(ethylene glycol)methyl ether acrylate (i.e. PEG-MEA), poly(ethylene glycol) diacrylate (i.e. PEGDEA) and the RAFT agent are added to a solution of N,N-dimethylformamide containing the initiator to form a second reaction mixture, wherein the initiator is 4,4'-azobis(4-cyanovaleric acid) and has a concentration of 0.012M. The polymerization of ethylene glycol in the PEGMEA is 15, and the polymerization of ethylene glycol in the PEGDEA is 22. 4,4'-azobis(4-cyanovaleric acid), the raft agent and the first reaction mixture formed by all the monomers involved in the polymerization are in a molar ratio of 1:2:100. The molar percentages of N-(2-acrylamidoethyl)-3-(2,3,4-trihydroxybenzoyl)benzamide, N-(2-aminoethyl)methacrylamide hydrochloride, N-(2-acrylamidoethyl)-4-azido-2,3,5,6-tetrafluorobenzamide, PEGDEA and PEGMEA are respectively 40%, 30%, 5%, 15% and 10%. After the second reaction mixture is stirred uniformly, the argon is introduced to the reaction system for 20-25 minutes to remove the oxygen. Then the reaction system is stirred at a stirring speed of 700 rmp and reacted at a temperature of 70° C. until an expected conversion is reached and a product with a desired molecular weight is obtained. Later, the reaction system is exposed to air and cooled in a cold water bath to terminate the reaction. The product is further purified with dichloromethane and diethyl ether to obtain a light brown hyperbranched cationic mussel-imitated polymer P1.

The structure of the hyperbranched cationic mussel-imitated polymer P1 is as follows:

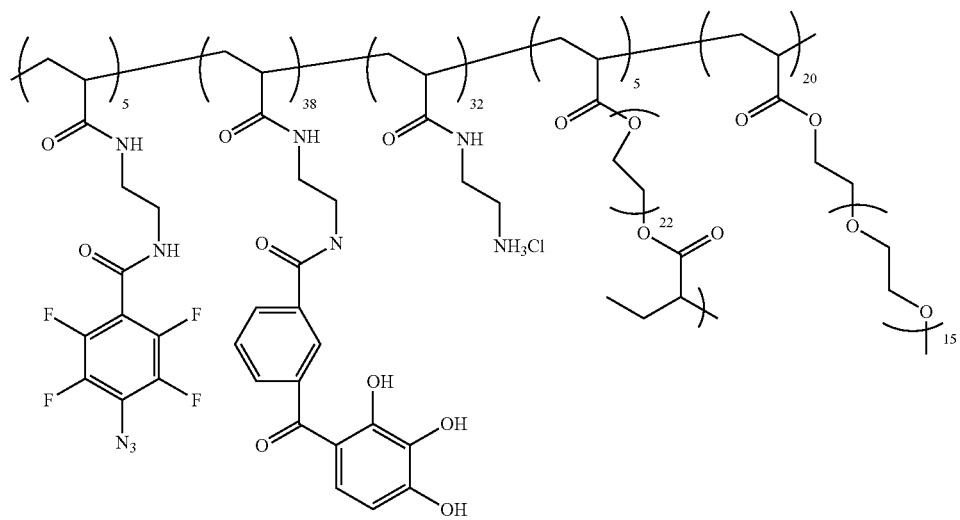

The detection result of the map for the structure of P1 is as follows:

$^1$H NMR (400 MHz, DMSO-D$_6$) δ(ppm): 7.90-8.2 (—NHCOC$_6$H$_4$CO—) 6.6-7.2 (C$_6$H$_2$(OH)$_3$), 5.35 (—C$_6$H$_3$(OH)$_2$), 4.32 (CH$_2$OOC—), 3.50-3.8 (—CH$_2$CH$_2$O—, —OCNHCH$_2$CH$_2$—), 3.22 (CH$_3$O—), 3.03 (—OCNHCH$_2$CH$_2$NH$_3$Cl), 2.16 (—CH$_2$CHCO—), 1.25-1.96 (—CH$_2$CHCO—);

$^{19}$F NMR (188 MHz, DMSO-D$_6$) δ(ppm): −134.69~−134.88(2F), −147.58~−147.71(2F).

EXAMPLE 2

Preparation of the Hyperbranched Cationic Mussel-Imitated Polymer P2:

N-(2-acrylamidoethyl)-4-(2,3,4-trihydroxybenzoyl)benzamide, N-(3-aminopropyl) acrylamide hydrochloride, N-(2-acrylamidoethyl)-4-azido-2,3,5,6-tetrafluorobenzamide, poly(ethylene glycol)methyl ether acrylate (i.e. PEGMEA), poly(ethylene glycol) diacrylate (i.e. PEGDEA) and the RAFT agent are added to a solution of N,N-dimethylformamide containing the initiator to form a second reaction mixture, wherein the initiator is 2,2'-azobis(2-methylpropionitrile) and has a concentration of 0.012M. The polymerization of ethylene glycol in the PEGMEA is 45, and the polymerization of ethylene glycol in the PEGDEA is 10. 2,2'-azobis(2-methylpropionitrile), the raft agent and the first reaction mixture formed by all the monomers involved in the polymerization are in a molar ratio of 1:2:100. The molar percentages of N-(2-acrylamidoethyl)-4-(2,3,4-trihydroxybenzoyl)benzamide, N-(3-aminopropyl) acrylamide hydrochloride, N-(2-acrylamidoethyl)-4-azido-2,3,5,6-tetrafluorobenzamide, PEGDEA and PEGMEA are respectively 20%, 33%, 2%, 35% and 10%. After the second reaction mixture is stirred uniformly, the argon is introduced to the reaction system for 20-25 minutes to remove the oxygen. Then the reaction system is stirred at a stirring speed of 700 rmp and reacted at a temperature of 70° C. until an expected conversion is reached and a product with a desired molecular weight is obtained. Later, the reaction system is exposed to air and cooled in a cold water bath to terminate the reaction. The product is further purified with dichloromethane and diethyl ether to obtain a light brown hyperbranched cationic mussel-imitated polymer P2.

The structure of the hyperbranched cationic mussel-imitated polymer P2 is as follows:

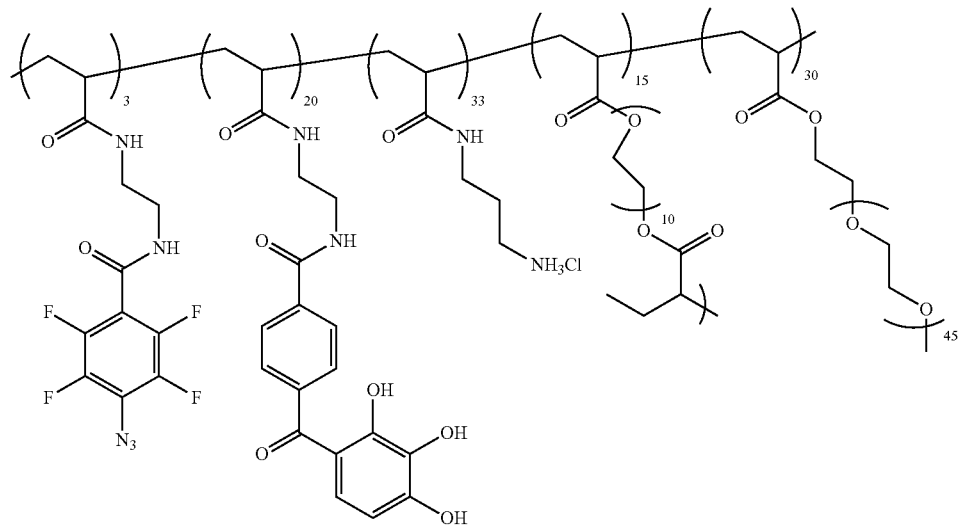

The detection result of the map for the structure of P2 is as follows:

$^1$H NMR (400 MHz, DMSO-D$_6$) δ(ppm):
7.90-8.2 (—NHCOC$_6$H$_4$CO—) 6.6-7.2 (C$_6$H$_2$(OH)$_3$), 5.35 (C$_6$H$_2$(OH)$_3$), 4.32 (CH$_2$OOC—), 3.50-3.8 (—CH$_2$CH$_2$O—, —OCNHCH$_2$CH$_2$—), 3.22 (CH$_3$O—), 3.03 (—OCNHCH$_2$CH$_2$NH$_3$Cl), 2.16 (—CH$_2$CHCO—), 1.25-1.96 (—CH$_2$CHCO—);
$^{19}$F NMR (188 MHz, DMSO-D$_6$) δ(ppm): −134.69~−134.88(2F), −147.58~−147.71(2F).

EXAMPLE 3

Preparation of the Hyperbranched Cationic Mussel-Imitated Polymer P3:

N-(2-acrylamidoethyl)-4-(3,4-dihydroxybenzoyl)benzamide, N-(4-aminobutyl) acrylamide hydrochloride, N-(2-acrylamidoethyl)-4-azidobenzamide, poly(ethylene glycol) methyl ether acrylate (i.e. PEGMEA), poly(ethylene glycol) diacrylate (i.e. PEGDEA) and the RAFT agent are added to a solution of N,N-dimethylformamide containing the initiator to form a second reaction mixture, wherein the RAFT agent is 2-(dodecyltrithiocarbonate)-2-methylpropionic acid, and the initiator is 2,2'-azobis(2-methylpropionitrile) and has a concentration of 0.012M. The polymerization of ethylene glycol in the PEGMEA is 5, and the polymerization of ethylene glycol in the PEGDEA is 8. 2,2'-azobis(2-methylpropionitrile), the raft agent and the first reaction mixture formed by all the monomers involved in the polymerization are in a molar ratio of 1:2:100. The molar percentages of N-(2-acrylamidoethyl)-4-(3,4-dihydroxybenzoyl) benzamide, N-(4-aminobutyl) acrylamide hydrochloride, N-(2-acrylamidoethyl)-4-azidobenzamide, PEGDEA and PEGMEA are respectively 25%, 35%, 5%, 30% and 5%. After the second reaction mixture is stirred uniformly, the argon is introduced to the reaction system for 20-25 minutes to remove the oxygen. Then the reaction system is stirred at a stirring speed of 700 rmp and reacted at a temperature of 70° C. until an expected conversion is reached and a product with a desired molecular weight is obtained. Later, the reaction system is exposed to air and cooled in a cold water bath to terminate the reaction. The product is further purified with dichloromethane and diethyl ether to obtain a light brown hyperbranched cationic mussel-imitated polymer P3.

The structure of the hyperbranched cationic mussel-imitated polymer P3 is as follows:

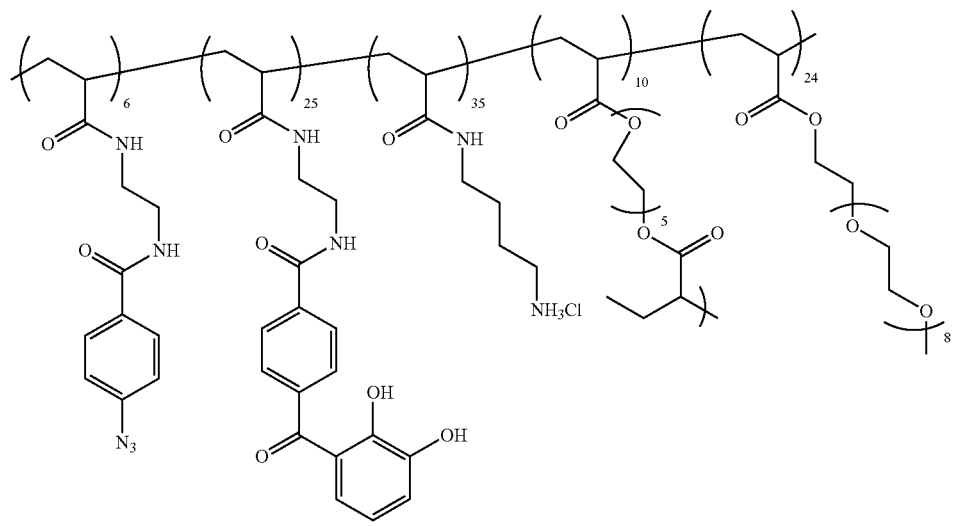

The detection result of the map for the structure of P3 is as follows:

$^1$H NMR (400 MHz, DMSO-D$_6$) δ(ppm): 7.90-8.2 (—NHCOC$_6$H$_4$CO—) 6.6-7.5 (N$_3$C$_6$H$_4$CO—, —C$_6$H$_3$(OH)$_2$), 5.35 (—C$_6$H$_3$(OH)$_3$), 4.32 (CH$_2$OOC—), 3.50-3.8 (—CH$_2$CH$_2$O—, —OCNHCH$_2$CH$_2$—), 3.22 (CH$_3$O—), 3.03 (—OCNHCH$_2$CH$_2$NH$_3$Cl), 2.16 (—CH$_2$CHCO—), 1.25-1.96 (—CH$_2$CHCO—).

EXAMPLE 4

Adhesive Strength Test:

The hyperbranched cationic mussel-imitated polymers P1, P2 and P3 are respectively dissolved in ethanol and water (volume ratio of 1:1) to obtain polymer binder solutions S1, S2 and S3, wherein each of the polymer binder solutions has a concentration of 15 wt %. 0.1 mL of the polymer binder solutions S1, S2 and S3, and the comparative example 1 and comparative example 2 are taken by the pipette and dropped on the surface of the tested substrates, and then evaporated for 2 minutes. Two substrates are clamped and illuminated under a high pressure mercury lamp for 5-30 minutes, preferably 10 minutes, to bind the two substrates together. The comparative example 1 uses commercially available polyurethane binder, and the comparative example 2 uses commercially available acrylate binder.

The adhesive strengths of the binders are tested by the multifunctional digital test, and the results are shown in Table 1:

TABLE 1

Adhesive strength of each binder to different substrates

| Binder | Adhesive strength to the graphene (MPa) | Adhesive strength to PET (MPa) | Adhesive strength to PP (MPa) | Adhesive strength to PVC (MPa) |
|---|---|---|---|---|
| S1 | 2.0 | 1.5 | 0.8 | 1.0 |
| S2 | 1.8 | 1.4 | 0.9 | 1.2 |
| S3 | 2.1 | 1.2 | 1.0 | 0.9 |
| Comparative example 1 | 1.1 | 0.8 | 0.7 | 0.6 |
| Comparative example 2 | 1.2 | 0.9 | 0.8 | 0.7 |

According to Table 1, the adhesive strengths of the binders prepared by the present invention to the graphene is 1.63-1.90 times of that of the comparative examples, thereby significantly improving the binding strength between the graphene material and polymer substrates and the safety, and enabling the graphene to be used as the barrier material for the film material with the high light transparency, which has a wide promotion value.

The aforementioned embodiments and examples further illustrate the purposes, technical solutions and beneficial effects of the present invention in detail. It is to be understood that the foregoing is only the embodiments of the present invention, and is not intended to limit the scope of the present invention. Any modifications, equivalent substitutes, improvements and the like made within the spirit and principle of the present invention should all be included in the scope of the present invention.

What is claimed is:

1. A hyperbranched cationic mussel-imitated polymer, having a structure of formula (I):

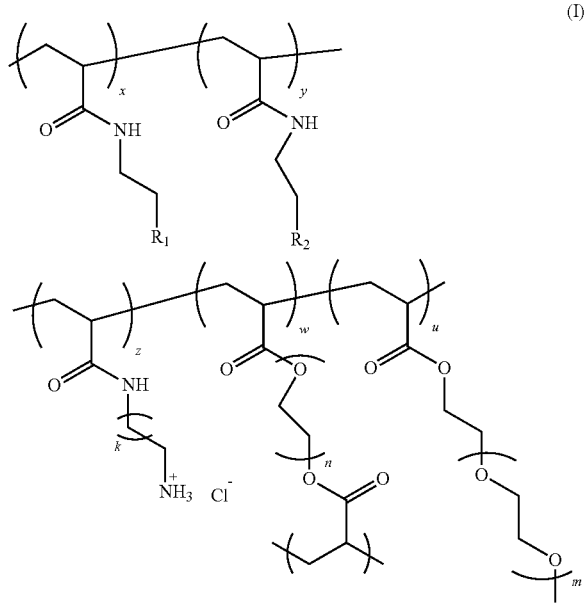

wherein x is 1-10, y is 20-80, z is 30-80, w is 5-20, u is 20-80, K is 1-5, n is 10-50, and m is 5-30;

wherein $R_1$ is a chemical group having a structure of formula (II):

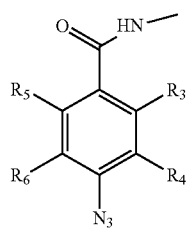

wherein $R_3$, $R_4$, $R_5$ or $R_6$ is individually selected from the group consisting of hydrogen and halogen; and wherein R2 is a chemical group selected from the group consisting of

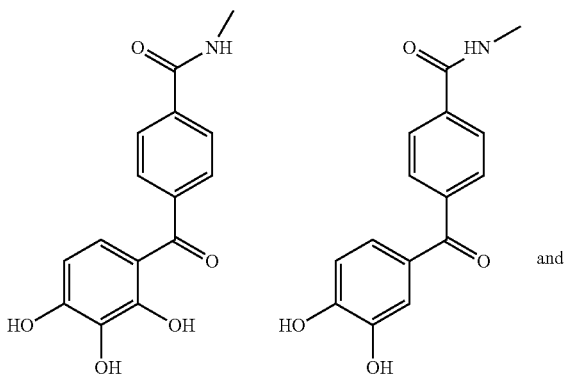

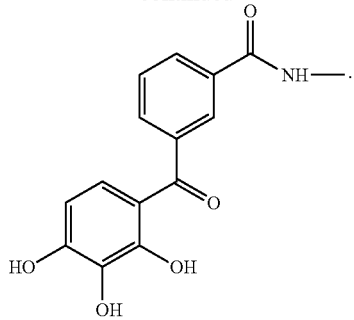

2. The hyperbranched cationic mussel-imitated polymer of claim 1, wherein $R_3$, $R_4$, $R_5$ or $R_6$ in formula (II) is individually selected from the group consisting of hydrogen and fluorine.

3. The hyperbranched cationic mussel-imitated polymer of claim 1, wherein $R_1$ is selected from the group consisting of

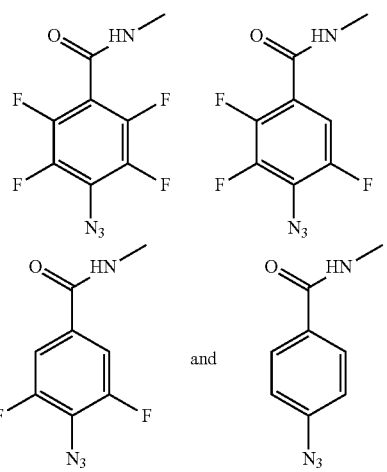

4. The hyperbranched cationic mussel-imitated polymer of claim 1, wherein K is 1-3, n is 20-30, and m is 10-20.

5. A method of preparing the hyperbranched cationic mussel-imitated polymer claimed in claim 1, comprising following steps:
(A) adding an initiator, a RAFT agent and a first reaction mixture to a vessel containing DMF to form a second reaction mixture;
(B) stirring the second reaction mixture until homogenous, and introducing argon to a reaction system to remove oxygen therein;
(C) heating and stirring the second reaction mixture to carry out a reaction;
(D) after a product with a desired molecular weight being produced, the reaction system being exposed to air and cooled rapidly in a cold water bath to terminate the reaction; and
(E) purifying the product to obtain the hyperbranched cationic mussel-imitated polymer;
wherein the first reaction mixture comprises a multi-hydroxylbenzoylbenzamide ene amide monomer, a cationic monomer, a photo-responsive monomer, poly(ethylene glycol) diolefine acid ester and poly(ethylene glycol) olefine acid ester.

6. The method of claim 5, wherein the multi-hydroxylbenzoylbenzamide ene amide monomer has a molar percentage of 20-40%, the cationic monomer has a molar percentage of 30-40%, the photo-responsive monomer has a molar percentage of 1-5%, poly(ethylene glycol) olefine acid ester has a molar percentage of 20-40%, and poly(ethylene glycol) diolefine acid ester has a molar percentage of 5-10%.

7. The method of claim 5, wherein the multi-hydroxylbenzoylbenzamide ene amide monomer is N-(2-acrylamidoethyl)-4-(2,3,4-trihydroxybenzoyl)benzamide, N-(2-acrylamidoethyl)-4-(3,4-dihydroxybenzoyl)benzamide or N-(2-acrylamidoethyl)-3-(2,3,4-trihydroxybenzoyl)benzamide; the cationic monomer is any one of N-(2-aminoethyl)acrylamide hydrochloride, N-(2-aminoethyl)methacrylamide hydrochloride, N-(3-aminopropyl)acrylamide hydrochloride, N-(3-aminopropyl)methacrylamide hydrochloride, N-(4-aminobutyl)acrylamide hydrochloride, N-(4-aminobutyl)methacrylamide hydrochloride, N-(6-aminohexyl)acrylamide hydrochloride, N-(6-aminohexyl)methacrylamide hydrochloride or (2-aminoethyl)methacrylate hydrochloride; the photo-responsive monomer is any one of N-(2-acrylamidoethyl)-4-azido-2,3,5,6-tetrafluorobenzamide, N-(2-acrylamidoethyl)-4-azido-2,3,5-trifluorobenzamide, N-(2-acrylamidoethyl)-4-azido-2,5-difluorobenzamide or N-(2-acrylamidoethyl)-4-azidobenzamide; poly(ethylene glycol) diolefine acid ester is either poly(ethylene glycol) diacrylate or poly(ethylene glycol) dimethacrylate; and poly(ethylene glycol) olefine acid ester is either poly(ethylene glycol)methyl ether acrylate or poly(ethylene glycol)methyl ether methacrylate.

8. The method of claim 5, wherein the initiator, the RAFT agent and the first reaction mixture are in a molar ratio of 1:2:100; and in the step (C), a reaction temperature is 60-90° C., and a stirring speed is 600-800 rmp.

9. The method of claim 8, wherein the initiator is 1,1-azobis(cyclohexanecarbonitrile), 2,2'-azobis(2-methylpropionitrile) or 4,4'-azobis(4-cyanovaleric acid); and the RAFT agent is any one of 2-(dodecyltrithiocarbonate)-2-methylpropionic acid, 4-cyano-4-(phenylthioformylthio)pentanoic acid or 2-cyano-2-propyl-4-cyanobenzene dithiocarbonate.

10. An adhesive, comprising the hyperbranched cationic mussel-imitated polymer claimed in claim 1.

* * * * *